United States Patent
Rusanovskyy et al.

(10) Patent No.: US 9,986,259 B2
(45) Date of Patent: May 29, 2018

(54) METHOD AND APPARATUS FOR PROCESSING VIDEO SIGNAL

(71) Applicant: LG ELECTRONICS INC., Seoul (KR)

(72) Inventors: Dmytro Rusanovskyy, Santa Clara, CA (US); Sehoon Yae, Seoul (KR); Taesup Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 14/905,200

(22) PCT Filed: Jul. 18, 2014

(86) PCT No.: PCT/KR2014/006532
§ 371 (c)(1),
(2) Date: Jan. 14, 2016

(87) PCT Pub. No.: WO2015/009098
PCT Pub. Date: Jan. 22, 2015

(65) Prior Publication Data
US 2016/0165262 A1 Jun. 9, 2016

Related U.S. Application Data

(60) Provisional application No. 61/856,011, filed on Jul. 18, 2013.

(51) Int. Cl.
*H04N 19/597* (2014.01)
*H04N 19/30* (2014.01)
*H04N 19/44* (2014.01)

(52) U.S. Cl.
CPC .......... *H04N 19/597* (2014.11); *H04N 19/30* (2014.11); *H04N 19/44* (2014.11)

(58) Field of Classification Search
CPC ....... H04N 19/597; H04N 19/44; H04N 19/30
See application file for complete search history.

(56) References Cited

U.S. PATENT DOCUMENTS

2003/0152285 A1* 8/2003 Feldmann ................ H04N 9/75
382/274
2008/0143715 A1 6/2008 Moden et al.
(Continued)

FOREIGN PATENT DOCUMENTS

JP 2012-503815 A 2/2012
KR 10-2011-0101792 A 9/2011
(Continued)

*Primary Examiner* — Zhihan Zhou
(74) *Attorney, Agent, or Firm* — Dentons US LLP

(57) ABSTRACT

The present invention relates to a method and an apparatus for processing a video signal, the method comprising: receiving a multiview video signal; identifying whether a current picture including a first layer and a second layer is decoded by using alpha data within the multiview video signal; obtaining the alpha data corresponding to the first layer and the second layer when the current picture is identified to be decoded by using the alpha data; and decoding a current block included in the current picture by using the alpha data, wherein the alpha data may include information concerning transparency information of the current picture.

4 Claims, 5 Drawing Sheets

(56) References Cited

U.S. PATENT DOCUMENTS

| | | | | |
|---|---|---|---|---|
| 2009/0315978 A1* | 12/2009 | Wurmlin | ............... | G06T 5/005 348/43 |
| 2011/0181588 A1* | 7/2011 | Barenbrug | ........... | G06T 15/205 345/419 |
| 2011/0234760 A1* | 9/2011 | Yang | ............... | H04N 13/0048 348/46 |
| 2012/0280996 A1* | 11/2012 | Kannan | ............... | G06T 15/20 345/426 |

FOREIGN PATENT DOCUMENTS

| KR | 10-2011-0106289 A | 9/2011 |
|---|---|---|
| KR | 10-2012-0101974 A | 9/2012 |

\* cited by examiner

FIG. 5

| | | |
|---|---|---|
| Video 0 - 0<br>D 0 - 0<br>A 0 - 0 | Video 1 - 0<br>D 1 - 0<br>A 1 - 0 | First layer |
| Video 0 - 1<br>D 0 - 1<br>A 0 - 1 | Video 1 - 1<br>D 1 - 1<br>A 1 - 1 | Second layer |
| View 0 | View 0 | |

FIG. 6

| | | |
|---|---|---|
| Video 0 - 0<br>D 0 - 0 | Video 1 - 0<br>D 1 - 0 | First layer |
| Video 0 - 1<br>D 0 - 1<br>A 0 - 1 | Video 1 - 1<br>D 1 - 1<br>A 1 - 1 | Second layer |
| View 0 | View 0 | |

METHOD AND APPARATUS FOR PROCESSING VIDEO SIGNAL

This application is a National Stage Entry of International Application No. PCT/KR2014/006532 filed Jul. 18, 2014, and claims the benefit of U.S. Provisional Application No. 61/856,011 filed Jul. 18, 2013, both of which are hereby incorporated by reference for all purposes as if fully set forth herein in their entireties.

TECHNICAL FIELD

The present invention relates to a method of coding a video signal and an apparatus therefor.

BACKGROUND ART

Compression encoding indicates a series of signal processing technologies for transmitting digitized information through a communication link or storing the digitized information in a form appropriate for a storing media. A target of the compression encoding includes voice, a video, a text and the like. In particular, a technology for performing the compression encoding on a target of a video is called a video image compression. A general characteristic of a multiview video is to have spatial redundancy, temporal redundancy and intertemporal redundancy.

DISCLOSURE OF THE INVENTION

Technical Task

An object of the present invention is to increase a coding efficiency of a video signal.

Technical Solution

According to the present invention, alpha data related to transparency is included in a multiview video signal data.

According to the present invention, alpha data is coded using texture data and depth data.

Technical tasks obtainable from the present invention are non-limited the above-mentioned technical task. And, other unmentioned technical tasks can be clearly understood from the following description by those having ordinary skill in the technical field to which the present invention pertains.

Advantageous Effects

According to the present invention, it is able to accurately decode a transparent part or a translucent part of a multiview video using alpha data.

According to the present invention, it is able to reduce the number of bits of a multiview video signal for decoding alpha data and perform efficient compression using texture data and depth data.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 5 is a diagram for an example of configuring a multiview video signal as an embodiment to which the present invention is applied;

FIG. 6 is a diagram for an example of configuring a multiview video signal as an embodiment to which the present invention is applied;

BEST MODE

Figure 1:
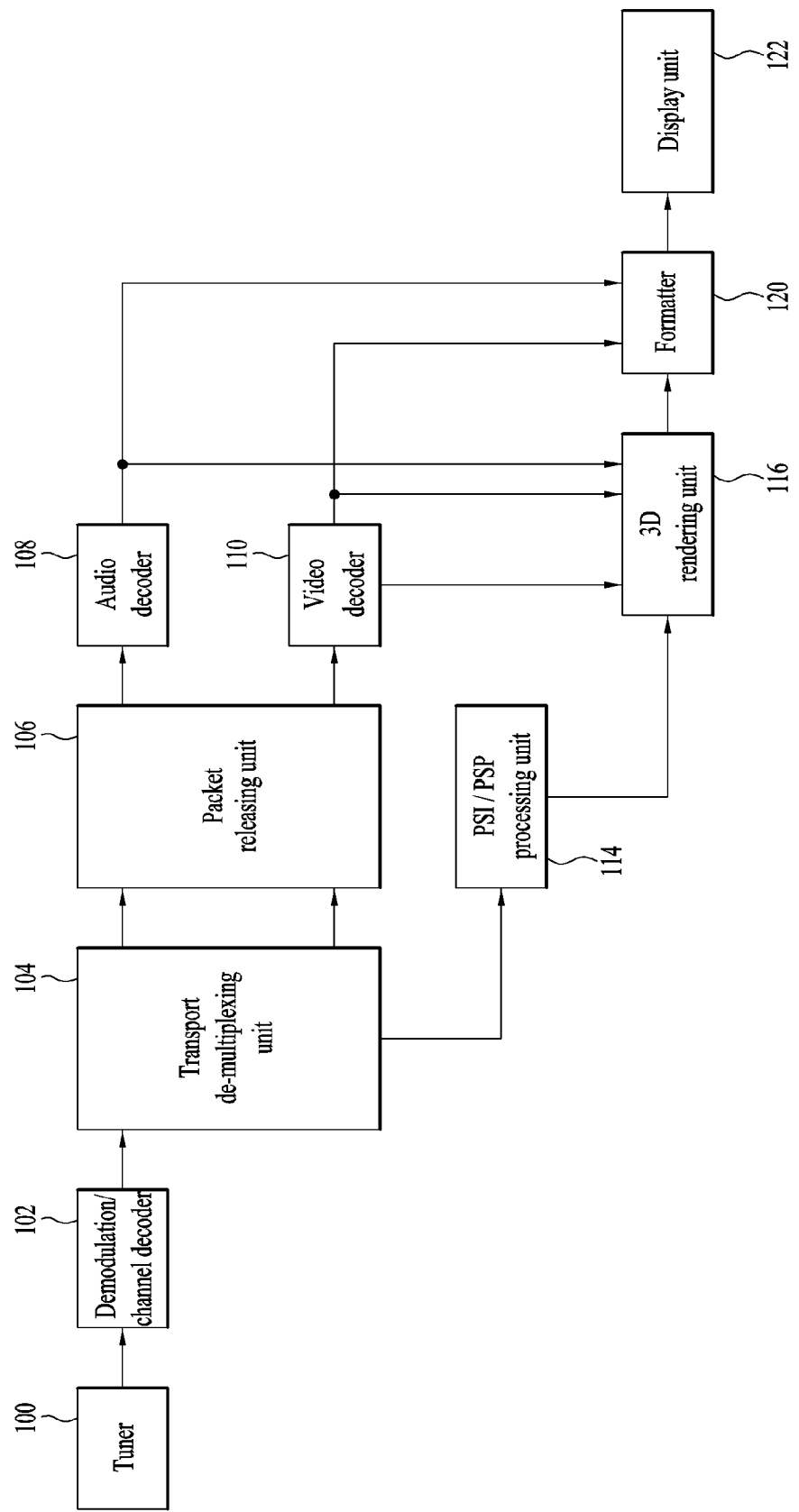
FIG. 1 is an internal block diagram for a broadcasting receiver to which depth coding is applied as an embodiment to which the present invention is applied.

According to the present invention, a method of processing a multiview video signal comprises: receiving the multiview video signal, identifying whether or not a current picture including a first layer and a second layer is decoded using an alpha data included in the multiview video signal, when the current picture is identified as being decoded using the alpha data, obtaining the alpha data corresponding to the first layer and the second layer and decoding a current block included in the current picture using the alpha data. In this case, the alpha data can include information related to transparency of the current picture.

According to the present invention, wherein decoding the current block using the alpha data can comprises: decoding the first layer, decoding the second layer and combining the first layer and the second layer with each other using the alpha data.

According to the present invention, the multiview video signal can include a texture data, a depth data and an alpha data corresponding to the first layer and a texture data, a depth data and an alpha data corresponding to the second layer.

According to the present invention, the multiview video signal can include a texture data and a depth data corresponding to the first layer and a texture data, a depth data and an alpha data corresponding to the second layer.

According to the present invention, the multiview video signal can include a texture data and a depth data corresponding to the first layer and a depth data and an alpha data corresponding to the second layer.

According to the present invention, a texture data corresponding to a background includes a brightness signal, a first color difference signal and a second color difference signal, a depth data corresponding to a foreground is obtained using the brightness signal corresponding to the background, a depth data corresponding to the background is obtained using the first color difference signal corresponding to the background and an alpha data corresponding to the foreground can be obtained using the second color difference signal corresponding to the background.

MODE FOR INVENTION

A technology for performing compression encoding or decoding on a multiview video signal considers spatial redundancy, temporal redundancy and intertemporal redundancy. In case of a multiview image, it may be able to perform coding on a multiview texture image captured at two or more viewpoints to implement a three dimensional (3D) image. And, if necessary, it may be able to further perform coding on a depth data corresponding to the multiview texture image. In case of coding the depth data, it is apparent that it is able to perform compression coding on the depth data in consideration of spatial redundancy, temporal redundancy and inter-temporal redundancy. The depth data corresponds to data in which information on a distance between a camera and a corresponding pixel is represented. In the present invention, the depth data can be flexibly interpreted as such information related to depth as depth information, a depth image, a depth picture, a depth sequence, a depth bit stream and the like. And, in the present invention, coding can include both a concept of encoding and a concept of decoding and can be flexibly interpreted according to a technical idea and a technical scope of the present invention.

FIG. 1 is an internal block diagram for a broadcasting receiver to which depth coding is applied as an embodiment to which the present invention is applied.

A broadcasting receiver according to the present embodiment is configured to receive an airwave broadcasting signal and play an image. The broadcasting receiver can generate 3D contents using received depth-related information. The broadcasting receiver includes a tuner 100, a demodulation/channel decoder 102, a transport de-multiplexing unit 104, a packet releasing unit 106, an audio decoder 108, a video decoder 110, an PSI/PSIP processing unit 114, a 3D rendering unit 116, a formatter 120 and a display unit 122.

The tuner 100 selects a broadcasting signal of a channel selected from a plurality of broadcasting signals inputted via an antenna (not depicted) and outputs the selected broadcasting signal. The demodulation/channel decoder 102 demodulates the broadcasting signal received from the tuner 100, performs error correction decoding on the demodulated signal and outputs a transport stream (TS). The transport de-multiplexing unit 104 de-multiplexes the transport stream, separates a video PES from an audio PES and extracts PSI/PSIP information from the transport stream. The packet releasing unit 106 releases a packet from the video PES and the audio PES and restores a video ES and an audio ES. The audio decoder 108 outputs an audio bit stream by decoding the audio ES. The audio bit stream is converted into an analog voice signal by a digital-analog converter (not depicted), amplified by an amplifier (not depicted) and outputted via a speaker (not depicted). The video decoder 110 restores an original image by decoding the video ES. A decoding procedure of the audio decoder 108 and the video decoder 110 can be performed based on a packet ID (PID) checked by the PSI/PSIP processing unit 114. In the decoding procedure, the video decoder 110 can extract depth information. And, the video decoder can extract additional information (e.g., camera information) necessary for generating an image of a virtual camera view or information (e.g., geometric information such as object contour, object transparency information and color information) necessary for estimating an area (occlusion) blocked by an object positioned at the relatively front and can provide the information to the 3D rendering unit 116. Yet, according to a different embodiment of the present invention, the depth information and/or the additional information can be separated from each other by the transport de-multiplexing unit 104.

The PSI/PSIP processing unit 114 receives the PSI/PSIP information from the transport de-multiplexing unit 104, parses the information and stores the parsed information in a memory (not depicted) or a register. By doing so, broadcasting can be played on the basis of the stored information. The 3D rendering unit 116 can generate color information, depth information and the like in a position of a virtual camera using a restored image, depth information, additional information and a camera parameter.

And, the 3D rendering unit 116 performs 3D warping using a restored image and depth information on the restored image and generates a virtual image in a virtual camera position. Although the present embodiment explains the 3D rendering unit 116 as a block configured in a manner of being separated from the video decoder 110, this is just an embodiment only. The 3D rendering unit 116 can be included in the video decoder 110.

The formatter 120 formats an image restored in the decoding procedure, i.e., an image captured by an actual camera, and a virtual image generated by the 3D rendering unit 116 in accordance with a displaying scheme of the corresponding receiver and makes a 3D image to be displayed via the display unit 122. In this case, synthesizing a depth information and a virtual image in the virtual camera position synthesized by the 3D rendering unit 116 and image formatting formatted by the formatter 120 can be selectively performed in response to a command of a user. In particular, a viewer can make a synthesized image not to be displayed by controlling a remote controller (not depicted) and may be able to designate time on which images are to be synthesized with each other.

As mentioned in the foregoing description, although the depth information is used by the 3D rendering unit 116 to generate a 3D image, as a different embodiment, the depth information can be used by the video decoder 110 as well. In the following, various embodiments of using the depth information used by the video decoder 110 are explained.

Figure 2:
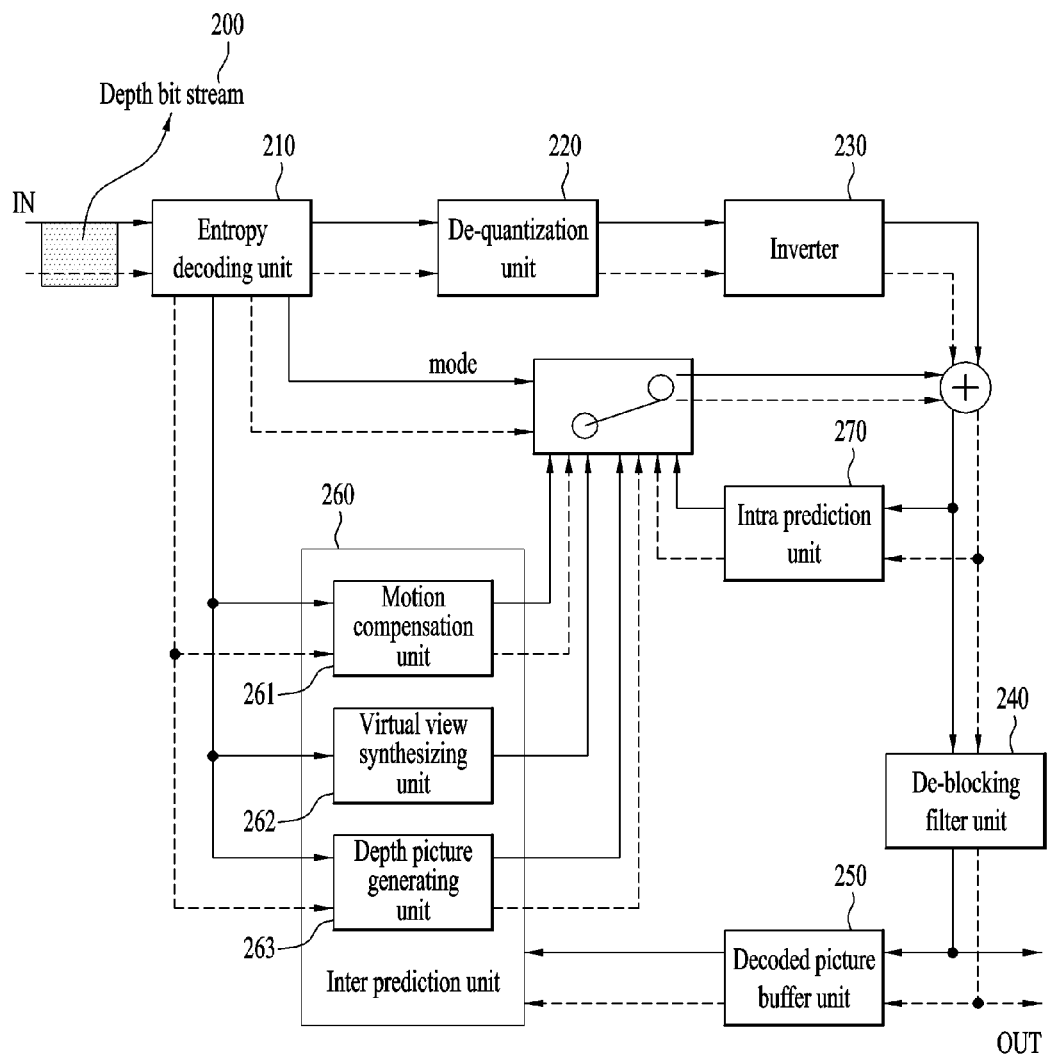
FIG. 2 is a schematic block diagram for a video decoder as an embodiment to which the present invention is applied.

FIG. 2 is a schematic block diagram for a video decoder as an embodiment to which the present invention is applied.

Referring to FIG. 2, the video decoder 110 can include an entropy decoding unit 210, a de-quantization unit 220, an inverter 230, a de-blocking filter unit 240, a decoded picture buffer unit 250, an inter prediction unit 260 and an intra prediction unit 270. In this case, a solid line indicates a flow of a color picture data and a dotted line indicates a flow of a depth picture data. Although the color picture data and the depth picture data are displayed in a manner of being separated from each other in FIG. 2, it may indicate a separate bit stream or a data flow only in a single bit stream. In particular, the color picture data and the depth picture data can be transmitted via a single bit stream or bit streams different from each other. FIG. 2 shows a data flow only. The present invention may be non-limited by a case of transmitting all data in a single decoder.

First of all, in order to decode a received depth bit stream 200, parsing is performed in NAL unit. In this case, various attribute information related to depth can be included in a NAL header region, an extended region of a NAL header, a sequence header region (e.g., a sequence parameter set), an extended region of a sequence header, a picture header region (e.g., a picture parameter set), an extended region of a picture header, a slice header region, an extended region of a slice header, a slice data region or a macro block region. Although depth coding can be used by a separate codec, if depth coding is compatible with a legacy codec, it may be more efficient to add various attribute information related to depth in case of a depth bit stream only. For example, it may be able to add depth identification information capable of identifying whether or not a bit stream corresponds to a depth bit stream in the sequence header region (e.g., a sequence parameter set) or the extended region of the sequence header. Attribute information on a depth sequence can be added only when an inputted bit stream corresponds to depth coded bit stream according to the depth identification information.

The parsed depth bit stream 200 is entropy decoded via the entropy decoding unit 210. A coefficient of each macro block, a moving vector and the like are extracted from the depth bit stream. The de-quantization unit 220 obtains a converted coefficient value in a manner of multiplying a received quantized value by a prescribed constant and the inverter 230 restores depth information of a depth picture by inverting the coefficient value. The intra prediction unit 270 performs prediction in a screen using the restored depth information of a current depth picture. Meanwhile, the de-blocking filter unit 240 applies de-blocking filtering to each of coded macro blocks to reduce a block distortion phenomenon. A filter improves image quality of a decoded frame in a manner of making an edge of a block to be smooth. A filtering procedure is selected based on boundary strength and a change (gradient) of an image sample near a boundary. In order to output filtered depth pictures or use the pictures as a reference picture, the pictures are stored in the decoded picture buffer unit 250.

The decoded picture buffer unit 250 performs a role of storing/opening previously coded depth pictures to perform prediction between screens. In this case, in order to store or open the depth pictures in the decoded picture buffer unit 250, it may use frame_num of each picture and a POC (picture order count). In case of performing depth coding, since there exist depth pictures of a view different from a view of a current depth picture among the previously coded pictures, in order to utilize the pictures as a reference picture, it may be able to use not only the frame_num and the POC but also depth view information for identifying a view of a depth picture.

And, the coded picture buffer unit 250 can use information on a depth view to generate a reference picture list for prediction between views of depth pictures. For example, the coded picture buffer unit 250 can use depth-view reference information. The depth-view reference information corresponds to information used for indicating a dependency relationship between views of depth pictures. For example, the depth-view reference information may include the total number of depth views, a depth view identification number, the number of depth-view reference pictures, a depth view identification number of a depth-view reference picture and the like.

In order to more flexibly implement prediction between screens, the coded picture buffer unit 250 manages a reference picture. For example, it may use a memory management control operation method and a sliding window method. This is intended for integrating a memory of a reference picture and a memory of a non-reference picture into a single memory and efficiently managing the reference picture and the non-reference picture with a small memory. In case of performing depth coding, depth pictures can be marked with a separate indication to distinguish the depth pictures from color pictures in the coded picture buffer unit. It may be able to use information for identifying each depth picture in the marking procedure. The reference pictures managed by the aforementioned procedure can be used by the inter prediction unit 260 for depth coding.

Referring to FIG. 2, the inter prediction unit 260 can include a motion compensation unit 261, a virtual view synthesizing unit 262 and a depth picture prediction unit 263.

The motion compensation unit 261 compensates for a motion of a current block using information transmitted from the entropy decoding unit 210. The motion compensation unit 261 extracts a motion vector of blocks in the vicinity of the current block from a video signal and obtains a motion vector prediction value of the current block. The motion compensation unit 261 compensates for the motion of the current block using the motion vector prediction value and a difference vector extracted from the video signal. The compensation for the motion can be performed using a single reference picture or a plurality of reference pictures. In case of performing depth coding, if a current depth picture refers to a depth picture of a different view, compensation for the motion can be performed using information on a reference picture list for prediction between views of depth pictures stored in the coded picture buffer unit 250. And, it may be able to perform the motion compensation using depth view information for identifying a view of the depth picture And, the virtual view synthesizing unit 262 synthesizes a color picture of a virtual view using a color picture of a view neighboring a view of a current color picture. In order to use color pictures of views adjacent to each other or use color pictures of a preferred specific view, it may be able to use view identification information indicating the view of the color picture. In case of generating the color picture of the virtual view, it may be able to define flag information indicating whether to generate the color picture of the virtual view. If the flag information indicates to generate the color picture of the virtual view, the color picture of the virtual view can be generated using the view identification information. The color picture of the virtual view obtained by the virtual view synthesizing unit 262 can be used as a reference picture. In this case, it is apparent that the view identification information is also assigned to the color picture of the virtual view.

As a different embodiment, the virtual view synthesizing unit 262 can synthesize a depth picture of a virtual view using a depth picture of a view neighboring a view of a current depth picture. Similarly, it may be able to use depth view identification information to indicate a view of a depth picture. In this case, the depth view identification information can be induced from view identification information of a corresponding color picture. For example, the corresponding color picture can include information on a picture output order identical to a picture output order of the current depth picture and identical view identification information.

The depth picture generating unit 263 can generate a current depth picture using depth coding information. In this case, the depth coding information can include a distance variable (e.g., Z coordinate on a camera coordinate system, etc.) indicating a distance between a camera and an object, macro block type information for depth coding, boundary line identification information in a depth picture, information indicating whether or not data in RBSP includes depth coded data, information indicating a type of data among depth picture data, color picture data and parallax data, and the like. And, it is able to predict a current depth picture using the depth coding information. In particular, it is able to perform inter prediction using a neighboring depth picture of a current depth picture. It is able to perform the inter prediction using decoded depth information in the current depth picture.

Meanwhile, if a transparent or translucent region or an object exists in a multiview image, it is difficult to perform a multiview image processing procedure using depth information. Hence, the present invention proposes a method of processing a multiview image by adding texture information and information on a transparent region as well as depth information and an apparatus therefor. As the information on the transparent region, alpha information is explained in the following.

Figure 3:
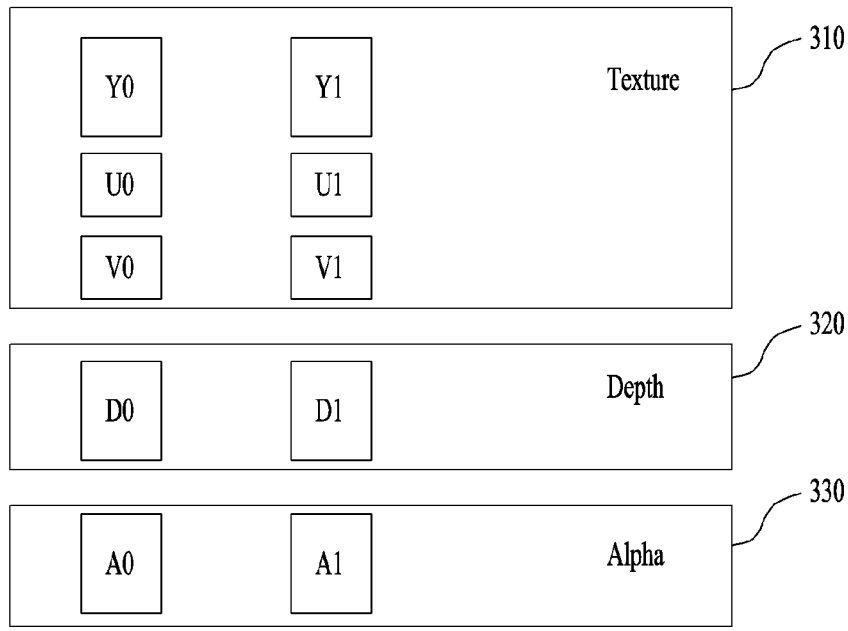
FIG. 3 is a diagram for an example of a multiview video signal including alpha data as an embodiment to which the present invention is applied.

FIG. 3 is a diagram for an example of a multiview video signal including alpha data as an embodiment to which the present invention is applied.

A multiview video signal can include a texture data 310, a depth data 320 and an alpha data 330. The texture data 310 can include a brightness signal (Y) and a color difference signal (U, V). And, the depth data 320 represents distance information between a camera and a corresponding pixel. And, the alpha data 330 can include all information on transparency. For example, the alpha data 330 can include information on whether or not a transparency effect of a current block is used and information on a level of the transparency effect.

A multiview image of the present invention can be configured in a manner of including a foreground layer and a background layer. And, the foreground layer may correspond to a layer arranged prior to the background layer. Hence, although the background layer exists, the background layer may not be displayed in a region at which the foreground layer exists. Yet, the background layer can be displayed in the region at which the foreground layer exists using the alpha data.

In the following, an example of decoding a multiview image using alpha data is explained with reference to FIG. 4.

Figure 4:
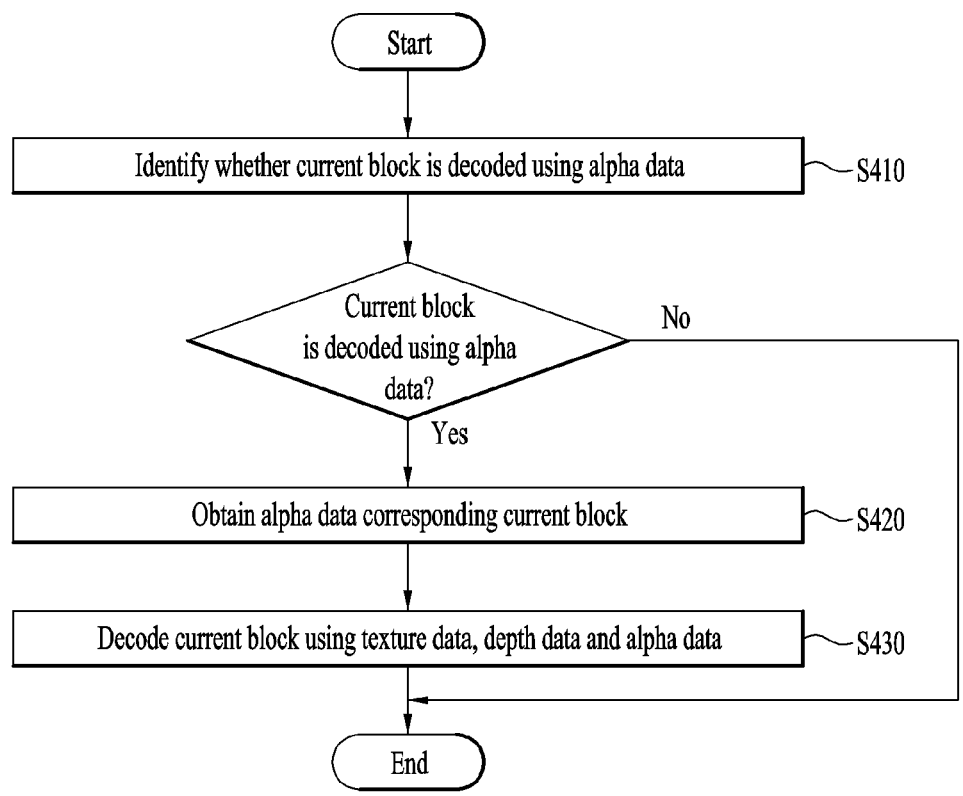
FIG. 4 is a flowchart for an example of decoding a multiview image using alpha data as an embodiment to which the present invention is applied.

FIG. 4 is a flowchart for an example of decoding a multiview image using alpha data as an embodiment to which the present invention is applied.

It is able to identify whether or not a current block is decoded using alpha data [S410]. Information on whether or not the current block uses alpha data can be identified using a flag indicating whether or not the alpha data exists. Or, the information can be identified by information on whether the alpha data exists in a multiview video signal corresponding to the current block.

The current block, which is identified by the information on whether or not the current block is decoded using the alpha data, may correspond to all blocks in a multiview image. Or, the current block may correspond to a block of a region in which both a foreground layer and a background layer exist. Or, the current block may correspond to a block of a region in which a foreground layer exists only.

If the current block corresponds to a block which is decoded using the alpha data, it may be able to obtain alpha data corresponding to the current block [S420]. The alpha data can be obtained from a multiview video signal or can be obtained using alpha data of a neighboring block. Or, the alpha data can be obtained using corresponding texture data and depth data.

The current block can be decoded using the texture data, the depth data and the alpha data [S430].

In the following, an embodiment of coding a multiview video signal is explained with reference to FIG. 5 to FIG. 8. In the following embodiment, assume that a multiview video signal includes two views (a reference view (V0) and a current view (V1)) and each view includes 2 layers (a first layer and a second layer). In FIG. 5 to FIG. 8, if the first layer is a layer corresponding to a foreground, the second layer may correspond to a layer corresponding to a background. On the contrary, if the first layer is a layer corresponding to a background, the second layer may correspond to a layer corresponding to a foreground, by which the present invention may be non-limited. The present invention can also be applied to a multiview video signal including two or more views and two or more layers.

FIG. 5 is a diagram for an example of configuring a multiview video signal as an embodiment to which the present invention is applied.

As shown in FIG. 5, a multiview video signal can include texture data (video0-0, video0-1, video1-0, video1-1), depth data (D0-0, D0-1, D1-0, D1-1) and alpha data (A0-0, A0-1, A1-0, A1-1) respectively corresponding to each view and each layer. Each of the texture data, the depth data and the alpha data included in the multiview video signal can be independently coded.

A layer of each view is obtained using a texture data and a depth data corresponding to a first layer and a texture data and a depth data corresponding to a second layer and a picture of a multiview image can be decoded in a manner of combining the obtained layers with each other using an alpha data of each view.

FIG. 6 is a diagram for an example of configuring a multiview video signal as an embodiment to which the present invention is applied.

A multiview video signal can be configured not to include alpha data in a specific layer. For example, as shown in FIG. 6, it may be able to configure a multiview video signal to include alpha data corresponding to a second layer of a reference view and a current view only. A first layer of a reference view and a current view may not include alpha data.

A layer of each view is obtained using a texture data (video0-0, video1-0) and a depth data (D0-0, D1-0) corresponding to a first layer and a texture data (video0-1, video1-1) and a depth data (D0-1, D1-1) corresponding to a second layer and a picture of a multiview image can be decoded in a manner of combining the obtained layers with each other using an alpha data (A0-1, A1-1) of the second layer.

Figure 7:
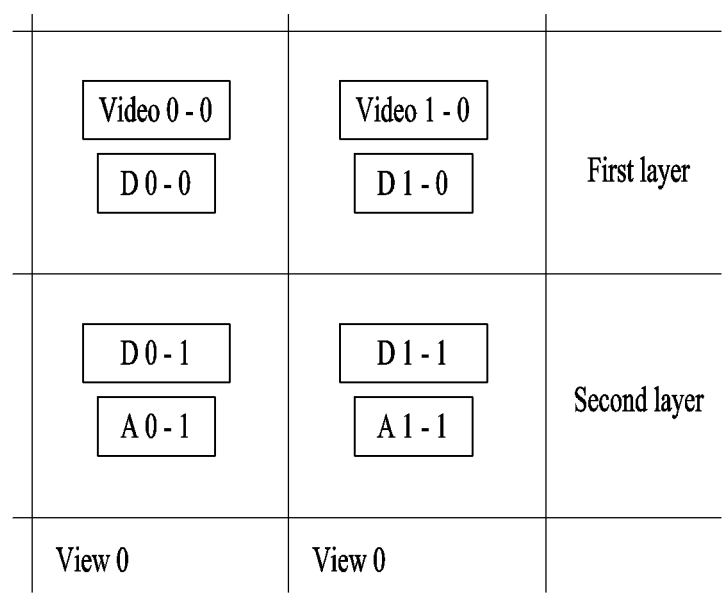
FIG. 7 is a diagram for an example of configuring a multiview video signal as an embodiment to which the present invention is applied.

FIG. 7 is a diagram for an example of configuring a multiview video signal as an embodiment to which the present invention is applied.

It is able to configure a multiview video signal not to include a texture data and an alpha data in a specific layer. For example, as shown in FIG. 7, it is able to configure a first layer of a reference view and a current view not to include alpha data and configure a second layer of a reference view and a current view not to include a texture data.

A layer of each view is obtained using a texture data (video0-0, video1-0) corresponding to the first layer and a depth data (D0-1, D1-1) corresponding to the second layer and a picture of a multiview image can be decoded in a manner of combining the obtained layers with each other using an alpha data (A0-1, A1-1) of the second layer.

In the following, an example of obtaining an alpha data of a multiview video signal is explained.

An alpha data can be obtained from a multiview video signal in a manner of being separately coded irrespective of a texture data and a depth data.

Or, an alpha data can be obtained using a texture data and a depth data. For example, a depth data corresponding to a foreground can be obtained using a brightness signal of a background. And, a depth data corresponding to the background can be obtained using a first color difference signal (U) of the background. And, an alpha data corresponding to the foreground can be obtained using a second color difference signal (V).

As mentioned in the foregoing description, a decoding/encoding device to which the present invention is applied is installed in a multimedia broadcasting transceiver such as a DMB (digital multimedia broadcasting) and can be used for decoding a video signal, a data signal and the like. And, the multimedia broadcasting transceiver can include a mobile communication terminal.

And, a decoding/encoding method to which the present invention is applied is manufactured by a program drivable in a computer and can be stored in a recording media readable by the computer. A multimedia data including a data structure according to the present invention can also be stored in the recording media readable by the computer. The recording media readable by the computer includes all types of storing devices in which data readable by a computer system is stored. Examples of the recording media readable by the computer include a ROM, a RAM, a CD-ROM, a magnetic tape, a floppy disk, an optical data storing device and the like. And, the recording media can be implemented in a form of a carrier wave (e.g., transmission via the internet). And, a bit stream generated by the encoding method can be stored in the recording media readable by the computer or can be transmitted via a wired/wireless communication network.

INDUSTRIAL APPLICABILITY

The present invention can be used for coding a video signal.

What is claimed is:

1. A method of processing a multiview video signal, comprising:
   receiving the multiview video signal;
   identifying whether or not a current picture containing a foreground layer and a background layer is decoded using alpha data contained in the multiview video signal;
   when the current picture is identified as being decoded using the alpha data, obtaining the alpha data corresponding to the foreground layer and the background layer; and
   decoding a current block contained in the current picture using the obtained alpha data,
   wherein the alpha data comprises information related to transparency of the current picture,
   wherein the multiview video signal comprises texture data, depth data, and the alpha data corresponding to the foreground layer, and texture data, depth data and the alpha data corresponding to the background layer,
   wherein the texture data corresponding to the background layer comprises a brightness signal, a first color difference signal, and a second color difference signal,
   wherein the depth data corresponding to the foreground layer is obtained using the brightness signal corresponding to the background layer,
   wherein the depth data corresponding to the background layer is obtained using the first color difference signal corresponding to the background layer, and
   wherein the alpha data corresponding to the foreground layer is obtained using the second color difference signal corresponding to the background layer.

2. The method according to claim 1, wherein decoding the current block includes:
   decoding the foreground layer;
   decoding the background layer; and
   combining the foreground layer and the background layer with each other using the alpha data.

3. A multiview video signal processing device, comprising:
   an entropy decoding unit configured to receive a multiview video signal; and
   an inter prediction unit configured to identify whether or not a current picture containing a foreground layer and a background layer is decoded using alpha data contained in the multiview video signal, when the current picture is identified as being decoded using the alpha data, the inter prediction unit configured to obtain the alpha data corresponding to the foreground layer and the background layer, the inter prediction unit configured to decode a current block contained in the current picture using the obtained alpha data,
   wherein the alpha data comprises information related to transparency of the current picture,
   wherein the multiview video signal comprises texture data, depth data, and the alpha data corresponding to the foreground layer, and texture data, depth data and the alpha data corresponding to the background layer,
   wherein the texture data corresponding to the background layer comprises a brightness signal, a first color difference signal, and a second color difference signal,
   wherein the depth data corresponding to the foreground layer is obtained using the brightness signal corresponding to the background layer,
   wherein the depth data corresponding to the background layer is obtained using the first color difference signal corresponding to the background layer, and
   wherein the alpha data corresponding to the foreground layer is obtained using the second color difference signal corresponding to the background layer.

4. The multiview video signal processing device according to claim 3, wherein the inter prediction unit is configured to decode the foreground layer, configured to decode the background layer and configured to combine the foreground layer and the background layer with each other using the alpha data.

* * * * *